(12) United States Patent
Alqudah et al.

(10) Patent No.: US 10,890,462 B2
(45) Date of Patent: Jan. 12, 2021

(54) TRAFFIC NOTIFICATION SYSTEM AND METHOD

(71) Applicant: Princess Sumaya University for Technology, Amman (JO)

(72) Inventors: Yazan Ahmad Alqudah, Amman (JO); Belal Hussein Mohammad Sababha, Amman (JO)

(73) Assignee: PRINCESS SUMAYA UNIVERSITY FOR TECHNOLOGY, Amman (JO)

( * ) Notice: Subject to any disclaimer, the term of this patent is extended or adjusted under 35 U.S.C. 154(b) by 67 days.

(21) Appl. No.: 16/019,459

(22) Filed: Jun. 26, 2018

(65) Prior Publication Data
US 2019/0390974 A1  Dec. 26, 2019

(51) Int. Cl.
G01C 21/36 (2006.01)
G08G 1/01 (2006.01)
G06K 9/00 (2006.01)
G08G 1/0967 (2006.01)

(52) U.S. Cl.
CPC ..... G01C 21/3691 (2013.01); G06K 9/00798 (2013.01); G08G 1/0141 (2013.01); G08G 1/096766 (2013.01)

(58) Field of Classification Search
None
See application file for complete search history.

(56) References Cited

U.S. PATENT DOCUMENTS

| | | | |
|---|---|---|---|
| 7,077,600 B1 * | 7/2006 | Whinery | E01F 9/553 404/12 |
| 8,174,374 B2 * | 5/2012 | Yim | G05D 1/0234 340/425.5 |
| 8,600,655 B2 * | 12/2013 | Ishikawa | G01C 21/26 382/104 |
| 10,127,462 B1 * | 11/2018 | Pratt | G06K 9/00798 |
| 2004/0160595 A1 * | 8/2004 | Zivkovic | E01C 23/163 356/73 |
| 2006/0267795 A1 * | 11/2006 | Draaijer | G08G 1/04 340/907 |
| 2009/0088978 A1 * | 4/2009 | Ishikawa | G08G 1/096725 701/514 |
| 2010/0158607 A1 * | 6/2010 | Mettler | E01F 9/529 404/15 |
| 2010/0292895 A1 * | 11/2010 | Nakamura | G08G 1/09623 701/41 |
| 2015/0161455 A1 * | 6/2015 | Osanai | G06K 9/00818 382/104 |
| 2016/0108591 A1 * | 4/2016 | Heerkens | E01C 17/00 362/84 |
| 2017/0345295 A1 * | 11/2017 | Mattar | G08G 1/0145 |

* cited by examiner

*Primary Examiner* — Peter D Nolan
*Assistant Examiner* — Demetra R Smith-Stewart
(74) *Attorney, Agent, or Firm* — Matheson Keys & Kordzik PLLC; Kelly Kordzik

(57) ABSTRACT

There is provided a system, method, and a computer program product that, when implemented, provides a user a notification about one or more road conditions. The system may include one or more sensors that may be configured to detect the presence and absence of one or more road markings, and a processing unit in operable communication with the one or more sensors configured to receive and process a plurality of sensor readings provided by the one or more sensors. A display in operable communication with the processing unit may be configured to display audio, visual, and audiovisual notification messages to a user.

11 Claims, 6 Drawing Sheets

TRAFFIC NOTIFICATION SYSTEM AND METHOD

TECHNICAL FIELD

The present disclosure relates to traffic notification systems and methods, and more particularly to traffic notification systems and methods that identify conditions and/or road information based on road markings to be sent as notifications for users or used in autonomous ground navigation systems.

BACKGROUND INFORMATION

Road signs play a critical role in regulating traffic and preventing accidents. They also provide information of interest to a vehicle occupant or a pedestrian. In general, road signs are displayed in visible places, and visual inspection is required to read and interpret the signs.

Attempts to automate the transmission of road sign information provided different systems that use visual cameras or scanners to capture images and/or videos of road markings or signs disposed on roads. The effectiveness of using cameras and/or visual scanners to capture, process, and analyze images and then present certain information to users based on the captured image or use the analyzed information in autonomous ground navigation systems is limited to daylight time and clear weather conditions.

SUMMARY

Aspects of the present disclosure provide an automated system that can automatically identify conditions and road information based on road markings using sensors and processing units.

In some aspects, there is provided a system for generating notifications related to traffic conditions including one or more sensors configured to detect a plurality of road markings provided on a surface, and a processing unit configured to be in operable communication with the one or more sensors. A display or other output device may be configured to be in operable communication with the processing unit.

In some aspects, the one or more sensors either may be standalone sensors or embedded in other systems or devices.

In some other aspects, the one or more sensors may include gyroscopes.

In other aspects, the road markings may include a plurality of spaced-apart stripes.

In some aspects, a displacement between each two consecutive stripes may be constant.

In yet other aspects, the displacement between each two consecutive stripes may be variable.

In aspects of the present disclosure, the road markings may include a plurality of grooves made on the surface.

In other aspects, the road markings may include an overlaying a material over the surface that results in variation of a surface height in a detectable way by the one or more sensors.

In aspects of the present disclosure, the road markings may be arranged such that each unique pattern of sensor readings encodes one or more specific messages.

In some aspects, the processing unit may decode sensor readings to determine a valid code word.

In some aspects, the processing unit may further look up a pre-defined table to translate the code word into a message.

In aspects of the present disclosure, the valid code word may include a binary code.

In some aspects, the display may be configured to display the message translated by the processing unit using the pre-defined table.

In some aspects, the display comprises visual display, audible display, and audiovisual display.

Other aspects of the present disclosure provide a system and/or method for notifying a user about a road condition, including providing one or more sensors configured to detect the presence of one or more road markings once such sensors move over them, deploying a plurality of road markings over a road surface, providing a processing unit in operable communication with the one or more sensors, providing a display in operable communication with the processing unit, storing in a memory device a plurality of codes and corresponding messages in a lookup table, receiving, by the processing unit, a plurality of sensor readings, processing, by the processing unit, the received sensor readings, converting, by the processing unit, the processed sensor readings into a code, identifying a message corresponding to the generated code by searching the lookup table, and displaying the identified message on the display.

In some aspects, the one or more sensors in the system and/or method of the present disclosure may include gyroscopes.

In other aspects, the one or more road markings in the system and/or method of the present disclosure may include one or more stripes.

In some aspects of the system and/or method of the present disclosure, the displacement between each two consecutive stripes may be constant.

In other aspects of the system and/or method of the present disclosure, the displacement between each two consecutive stripes may be variable.

In some aspects, the road markings in the system and/or method of the present disclosure may include a plurality of grooves made on the surface.

In other aspects of the system and/or method of the present disclosure, the road markings may include an overlaying a material over the surface that results in variation of a surface height in a detectable way by the one or more sensors.

In aspects of the system and/or method of the present disclosure, the road markings may be arranged such that each unique pattern of sensor readings encode one or more specific messages.

In some aspects of the system and/or method of the present disclosure, the processing unit may include a microprocessor.

In some aspects, the display in the system and/or method of the present disclosure may include audio, visual, and audiovisual display.

In some aspects of the system and/or method of the present disclosure, the plurality of sensor readings may include a plurality of peaks.

In aspects of the system and/or method of the present disclosure, the plurality of codes may include binary codes.

In some aspects of the system and/or method of the present disclosure, each code may entitle one or more unique messages.

In aspects of the system and/or method of the present disclosure, processing the plurality of sensor readings may include determining a variability in the data provided by the one or more sensors, determining a moving variance in the data provided by the one or more sensors, identifying the peaks in the data, determining a time lapse between shortest peaks, and determining if a peak exists.

Aspects of the present disclosure also provide a computer program product stored on a computer readable storage medium, which when executed, may perform a method for notifying a user about a road condition, the method may include storing on a memory device a plurality of codes and corresponding messages in a lookup table, receiving by one or more sensors a plurality of readings resulting from moving over a plurality of road markings, converting the plurality of sensor readings into a generated code, identifying a message corresponding to the generated code by searching the lookup table, and displaying the identified message on a display.

Other aspects of the present disclosure provide a vehicle using the system and/or method of the present disclosure.

BRIEF DESCRIPTION OF THE DRAWINGS

The disclosure will now be described with reference to the accompanying drawings, which illustrate embodiments of the present disclosure, without limiting the scope of the disclosure thereof, and in which.

DETAILED DESCRIPTION

Figure 1:
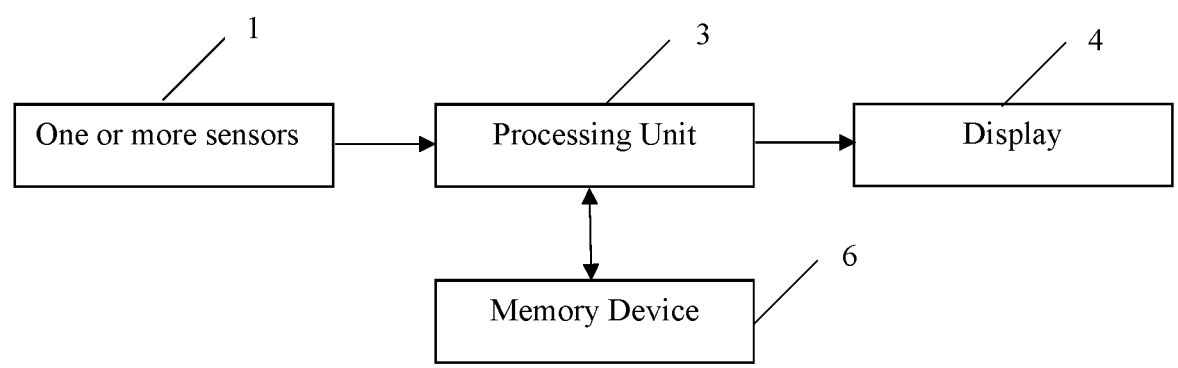
FIG. 1 illustrates a block diagram of a system configured in accordance with embodiments of the present disclosure.

FIG. 1 illustrates a block diagram of a traffic notification system configured in accordance with embodiments of the present disclosure. The system may include one or more sensors 1 configured to detect a plurality of road markings 2 (see FIG. 2), and a processing unit 3 that may be in operable communication with the one or more sensors 1 and configured to process the readings of the one or more sensors 1.

Embodiments of the present disclosure may further include a display 4 that may be in operable communication with the processing unit 3, wherein the display 4 may include a screen and an audio speaker (not shown) and may be configured to notify a user of conditions and road information using audio, visual, or audiovisual messages. In accordance with some embodiments of the present disclosure, the display 4 may not be utilized, but instead, only an audio speaker is utilized to provide the notification.

In accordance with embodiments of the present disclosure, the readings of the one or more sensors 1, after being processed by the processing unit 3, may be used as inputs to control an operation of an autonomous ground vehicle, such as changing speed, changing direction and/or path, stop the navigation process, etc.

In accordance with embodiments of the present disclosure, the one or more sensors 1 may include gyroscopes or any other suitable type of motion or positioning sensor(s).

Figure 2:
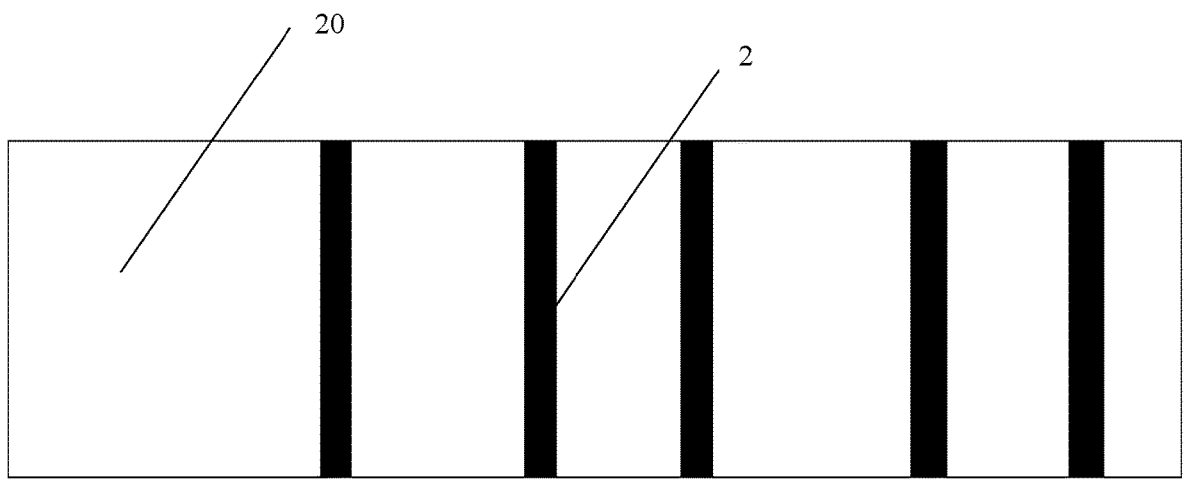
FIG. 2 illustrates a schematic diagram of a set of road markings used in a system and/or method configured in accordance with embodiments of the present disclosure.

Referring to FIG. 2, there is illustrated an exemplary patch of road 20 that incorporates one or more road markings 2. In accordance with embodiments of the present disclosure, the one or more road markings 2 may include a plurality of spaced-apart stripes with various predetermined displacements between each two consecutive (adjacent) stripes. Such stripes may be formed by creating (e.g., forming or cutting) grooves in the surface of the road 20, or by overlaying a material over the surface of the road 20 that results in variation(s) of the surface height(s) of the stripes (relative to the surface height of the surrounding surface of the road 20) in a detectable way. Alternatively, the spaced-apart stripes may also be formed by embedding metallic particles in the road surface that are detectable by a metal detection device that may be embedded in the vehicle.

The road markings 2 may include two types, a first type in which the stripes are spaced apart equally in order for the processing unit 3 to determine the expected spacing between each two consecutive (adjacent) stripes in the road markings; and/or a second type in which the stripes are spaced apart and in which their presence or absence convey a peak (e.g., of a signal) for the processing unit 3 to decode.

In some embodiments, the road markings 2 may be dynamic (e.g., they can be activated through motor action remotely), wherein a road marking may be laid down flat to cause no vibration or rotated (by motor) to result in an indentation in the road (or a raised surface relative to the flat road surface) that will cause a vibration detectable by the one or more sensors 1.

In accordance with embodiments of the present disclosure, the one or more sensors 1 may be configured to send a peak signal (e.g., representing a logical (e.g., binary) 1 value) to the processing unit 3 when the one or more sensors 1 detect the presence of a stripe within a road marking 2, and may also be configured to send a substantially low value signal (e.g., representing a logical (e.g., binary) 0 value) to the processing unit 3 when a stripe in the road marking 2 is absent.

The second type of the road markings 2 may be arranged such that each unique pattern of sensor readings sent by the one or more sensors 1 to the processing unit 3 encode one or more specific messages, as illustrated later in an example.

In accordance with embodiments of the present disclosure, the processing unit 3 may be configured to decode the sensor readings to determine a valid code word (e.g., a binary code), and to utilize a look up to a pre-defined table to translate the code word into a notification (e.g., a message).

Figure 3:
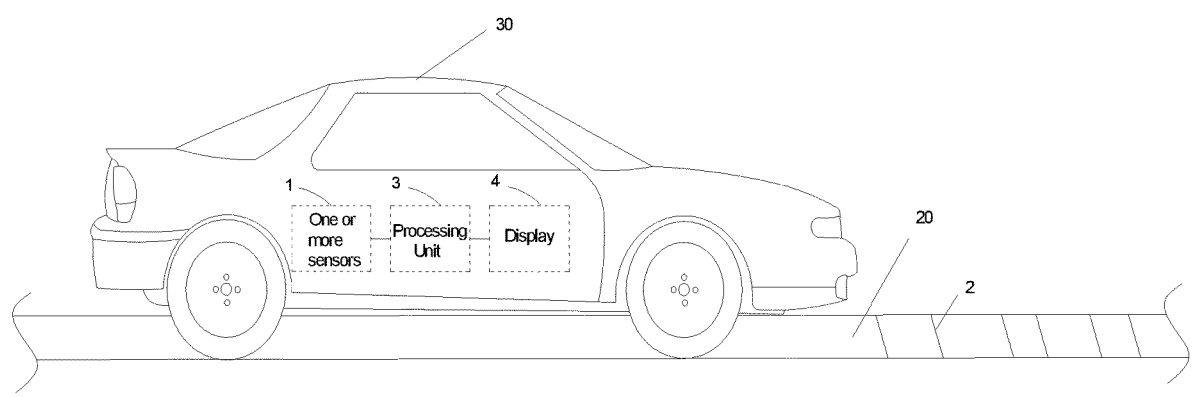
FIG. 3 illustrates an exemplary vehicle utilizing a system and/or method configured in accordance with embodiments of the present disclosure.

Referring now to FIG. 3, there is illustrated an exemplary vehicle 30 that includes a system and implements a method configured in accordance with embodiments of the present disclosure as described herein with respect to FIGS. 1, 2, 4, 5, and 6.

To implement embodiments of the present disclosure, road markings 2 may be deployed at strategic locations on a road 20 such as road ends, before an intersection, or before specified road conditions that require alerting drivers or autonomous vehicles. In accordance with certain embodiments of the present disclosure, road markings 2 may be configured as indentations in the road surface such that a vibration can be detected by the vehicle 30 when it passes over the road markings 2. A sensors unit that employs on or more sensors 1 capable of detecting motion parameters variations (e.g., a gyroscope) may be used to detect the vibration(s) caused by the road markings 2. Each road marking 2 may result in a signal that is delivered to a processing unit 3. The processing unit 3 stores the occurrence of the signal. Depending on the location, arrangement of the road marking and the distance between individual markings, the processing unit generates a code that corresponds to the markings locations. As a non-limiting example, the generated code may be [1 0 1 0 1 1], wherein each "1" represents the sensing of a road marking 1 while each "0" represents the absence of a road marking 1 (i.e., in FIG. 2, the gaps between the road markings 2).

Figure 4:
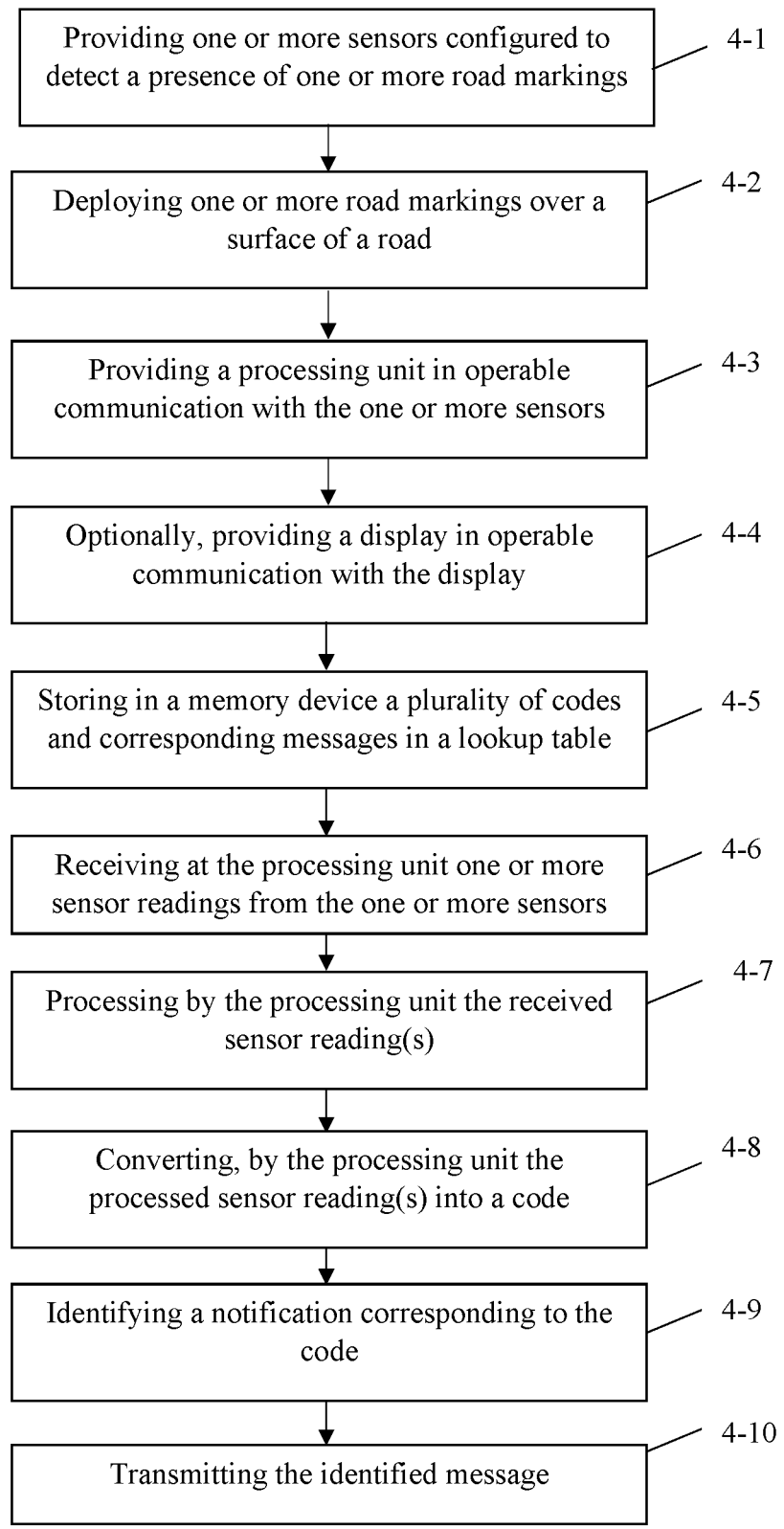
FIG. 4 illustrates a flowchart of a system and/or method for providing a notification about a road condition, the system and/or method being configured in accordance with embodiments of the present disclosure.

Referring now to FIG. 4, there is illustrated a flowchart of a system and/or method for providing a notification (e.g., to a user about a traffic condition), the system and/or method may include providing one or more sensors 1 in a vehicle, the sensors being configured to detect the presence of one or more road markings 2 once such one or more sensors 1 move over them or are otherwise within a sufficient proximity so that the one or more sensors 1 are capable of detecting the one or more road markings 2 (process block 4-1). In the process block 4-2, one or more road markings 2 are deployed on a surface of a road 20 in a way that make such road markings 2 are detectable by the one or more sensors 1. The system and/or method of the present disclosure may further include providing a processing unit 3, wherein the processing unit 3 is configured to be in operable communication with the one or more sensors 1 and to process reading(s) of the one or more sensors 1 (process block 4-3). A display 4 (or other output device, such as an audio speaker) may optionally be provided to be in operable communication with the processing unit 3, wherein the display 4 is configured to output notifications to a user (process block 4-4). The system and/or method of the present disclosure may further include storing in a memory device 6 a plurality of codes and corresponding messages in a lookup table (process block 4-5). In the system/method of the present disclosure, readings(s) of the one or more sensors 1 indicating the presence or absence of the road markings 2 are sent to the processing unit 3 (process block 4-6), where they are processed (process block 4-7), and converted into a code (process block 4-8). The system and/or method of the present disclosure may additionally include identifying a notification (e.g., a message) corresponding to the generated code by searching the lookup table (process block 4-9), and transmitting the notification (e.g., displaying the identified message on the display 4) (process block 4-10).

In embodiments of the present disclosure, the lookup table may be static such that the corresponding messages of each of the plurality of codes do not change.

In other embodiments, the lookup table may be dynamic such that the corresponding messages of each of the plurality of codes is updated over a communication network such as a Global System for Mobile Communications ("GSM") or Internet (not shown).

In accordance with embodiments of the present disclosure, the generated code may convey warning information or instructions to drivers or autonomous vehicles.

In embodiments of the present disclosure, the notification may include, but not limited to, speed limit, curvy road ahead, there is an accident ahead, steep downhill, or dangerous curve.

In embodiments of the present disclosure, the code may also be used to determine the location of the vehicle, which may enable an autonomous vehicle to calibrate its position obtained using a Global Positioning System ("GPS") with a corresponding known location of the one or more road markings 2.

In embodiments of the present disclosure, an autonomous vehicle may use the generated code to perform an action, for example, the code may be used to instruct the vehicle that the speed limit has been reduced, or there is congestion ahead due to an accident (and to possibly change lanes or seek an alternate route), etc.

Figure 5:
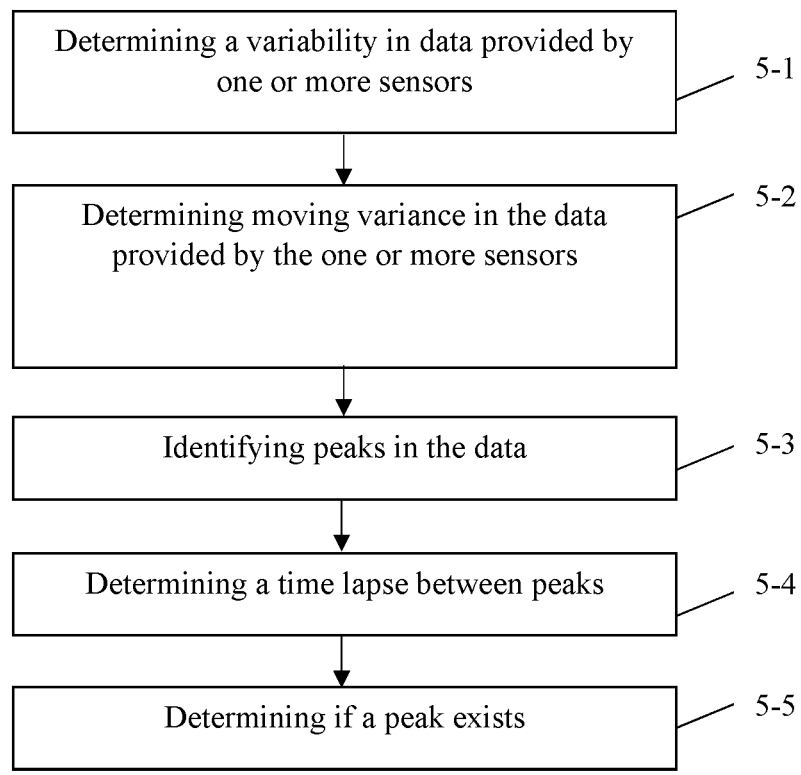
FIG. 5 illustrates a flowchart of a system and/or method of processing sensor readings in a system and/or method for providing a notification about a road condition, the system and/or method being configured in accordance with embodiments of the present disclosure.

Reference now is being made to FIG. 5, which illustrates a system and/or method of generating and decoding a code by the processing unit 3 based on the one or more sensor readings, wherein the system and/or method may include:
 a. Determining a variability in the data provided by the one or more sensors 1 (process block 5-1);
 b. Determining a moving variance in the data provided by the one or more sensors 1 (process block 5-2);
 c. Identifying the peaks in the data (process block 5-3);
 d. Determining a time lapse between peaks (process block 5-4); and
 e. Determining if a peak exists (process block 5-5).

In accordance with embodiments of the present disclosure, the determination of the variability by the process block 5-1 may be performed according to the following formula:

$$v = \frac{1}{N-1} \sum_{i=1}^{N} |X_i - \mu|^2$$

wherein v represents the variability, X represents the sensor data, $\mu$ represents the arithmetic mean of X, and N represents the number of sensor readings. The system relies on detecting vibration(s) caused by markings on the road. As the vehicle passes over the markings, the indentations (or raised portions) of the markings will cause vibration(s) that are detected (e.g., by a gyroscope). The formula calculates the variance in the sensor data to detect the extra vibration(s) caused by the markings.

In accordance with embodiments of the present disclosure, the moving variance may be determined by the process block 5-2 according to the following formula:

$$v(n) = \frac{1}{m} \sum_{i=n-m+1}^{n} |X_i - \mu(n)|^2$$

wherein v(n) represents the moving variance, m represents the window size used to determine moving variance, X represents the sensor data, and $\mu(n)$ is determined by the following formula:

$$\mu(n) = \frac{1}{m} \sum_{i=n-m+1}^{n} X_i$$

wherein m represents the window size used, X represents the sensor data, and n represents the number of sensor readings.

Figure 6:
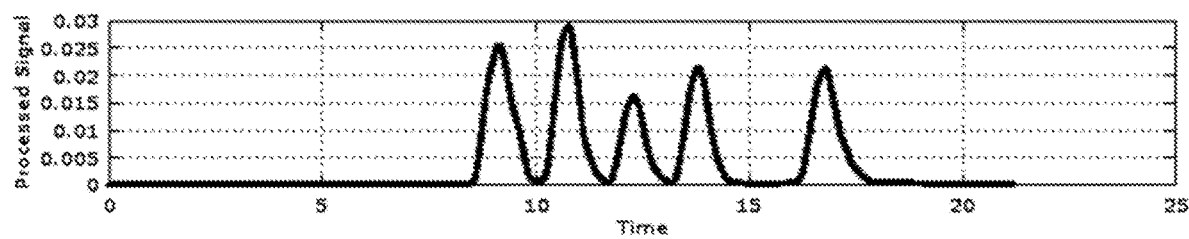
FIG. 6 illustrates an exemplary sensor reading that is to be processed by a processing unit of a traffic notification system configured in accordance with embodiments of the present disclosure.

The moving variance v(n) may provide an accurate estimation of a location of one or more road markings 2 versus time as shown in FIG. 6. A peak in FIG. 6 may represent a presence of one road marking while a lack of a peak may indicate an absence of one road marking.

The following example illustrates embodiments of the present disclosure without, however, limiting the same thereto.

EXAMPLE

This example is performed with reference to FIG. 6, which illustrates an exemplary reading by the one or more sensors 1, which is then processed by the processing unit 3. As shown in FIG. 6, the exemplary sensor readings have peaks at approximately 8.8, 10.3, 12, 13.2, 15, and 16.1 seconds. Since peaks exist except at a time of approximately 15 seconds, an exemplary binary code generated by the processing unit 3 could be "111101." After that, the processing unit 3 may perform a look up in a pre-defined table, such as the exemplary Table 1, to translate the binary code into a notification (e.g., a message for display on the display 4). For instance, the code "111101" could be translated as "Curvy Road Ahead," which could then be displayed on the display 4 (or instead provided to a user in audible form).

TABLE 1

| Code | Message |
| --- | --- |
| 000000 | Slow Down |
| 000001 | Speed Limit Changed |
| . | . |
| . | . |
| . | . |
| 111101 | Curvy Road Ahead |
| . | . |
| . | . |
| . | . |

While the present disclosure has been described in detail and with reference to specific embodiments, it will be apparent to those skilled in the art that various additions, omissions, and/or amendments can be made without departing from the scope and spirit thereof.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "circuitry," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing (e.g., see the memory device 6 in FIG. 1). More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus (e.g., see the processing unit 3 in FIG. 1) to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A method for notifying a user about a traffic condition, comprising:
   sensing by one or more sensors a presence of one or more road markings deployed over a road surface as such sensors pass over the one or more road markings, wherein the sensing results in sensor readings;
   receiving the sensor readings by a processing unit in operable communication with the one or more sensors;
   converting, by the processing unit, the sensor readings into a code, wherein the converting of the sensor readings comprises:
      determining a variability in the sensor readings provided by the one or more sensors;
      determining a moving variance in the sensor readings provided by the one or more sensors;
      identifying peaks in the sensor readings;
      determining a time lapse between shortest peaks; and
      determining if a peak exists;
   identifying a message corresponding to the generated code by searching a lookup table stored in a memory device, wherein the lookup table contains a plurality of codes and corresponding messages; and
   outputting the identified message.

2. The method of claim 1, wherein the road markings are arranged such that each unique pattern of sensor readings encode one or more specific messages.

3. The method of claim 1, wherein the one or more road markings comprise a plurality of spaced-apart stripes deployed on the road surface.

4. The method of claim 3, wherein a displacement between each two consecutive ones of the plurality of spaced-apart stripes is constant.

5. The method of claim 3, wherein a displacement between each two consecutive ones of the plurality of spaced-apart stripes is variable.

6. The method of claim 1, wherein the one or more road markings comprise a plurality of grooves formed on the road surface.

7. The method of claim 1, further comprising displaying the identified message on a display in operable communication with the processing unit.

8. The method of claim 7, wherein the message is configured to display information pertaining to the traffic condition.

9. The method of claim 1, wherein the one or more sensors are vibration sensors that sense vibrations caused in a vehicle as it travels over the one or more road markings.

10. The method of claim 1, wherein the one or more sensors each comprise a gyroscope.

11. The method of claim 1, wherein the one or more road markings comprise an overlaying of a material over the road surface that results in variation of a surface height of the one or more road markings in a detectable way by the one or more sensors.

* * * * *